United States Patent
Nyman

[11] 3,744,029
[45] July 3, 1973

[54] PROGRAMMABLE SEQUENTIAL CONTROL MEANS HAVING A PLURALITY OF CONTROL CIRCUITS FOR CONTROLLING A RESPECTIVE PLURALITY OF DISCRETE SUBOPERATIONS

[75] Inventor: Bengt Ebbe Harald Nyman, Rockford, Ill.

[73] Assignee: Atlas Copco Aktiebolag, Nacka, Sweden

[22] Filed: Apr. 22, 1970

[21] Appl. No.: 30,909

[30] Foreign Application Priority Data
Apr. 25, 1969 Sweden .............................. 5941/69

[52] U.S. Cl........ 340/172.5, 137/81.5, 137/624.18
[51] Int. Cl. ...................... F15b 21/02, F15b 11/22
[58] Field of Search............. 340/172.5; 307/218, 307/232; 235/151.11; 137/81.5, 624.18, 627, 627.5, 628

[56] References Cited
UNITED STATES PATENTS

| | | | |
|---|---|---|---|
| 3,414,884 | 12/1968 | Jensen ............................. | 340/172.5 |
| 3,467,948 | 9/1969 | Barlow et al..................... | 340/172.5 |
| 3,474,262 | 10/1969 | Turcotte ......................... | 307/218 X |
| 3,484,700 | 12/1969 | Armstrong...................... | 307/218 X |
| 3,410,310 | 11/1968 | Ray................................. | 137/627.5 |
| 3,478,731 | 11/1969 | Morton et al.................. | 137/81.5 X |
| 3,550,606 | 12/1970 | Thorburn......................... | 137/81.5 |
| 3,553,489 | 1/1971 | Spencer et al..................... | 307/232 |
| 3,565,114 | 2/1971 | Rousseau....................... | 137/81.5 X |
| 3,612,906 | 10/1971 | Kennedy...................... | 340/172.5 X |
| 3,620,127 | 11/1971 | Blaisdell..................... | 137/624.18 X |

OTHER PUBLICATIONS

Hadekel, R., "Automatic Sequencing Circuits" in Automation, June, 1958; pp. 69–76

*Primary Examiner*—Paul J. Henon
*Assistant Examiner*—Melvin B. Chapnick
*Attorney*—Bauer and Goodman

[57] ABSTRACT

A control means for controlling sequences of events or working operations in machinery and plants. The control means is particularly advantageous in that it is able to control sequences which are going on simultaneously or partly simultaneously and which are dependent or independent of each other. This is by virtue of a control circuit which responds to two concurrently applied input signals to generate a signal if a predetermined one of these signals arrives earlier than the other and if said circuit beforehand has been set in a responsive condition by means of a third input signal, the generated signal being supplied to program means for controlling the sequences of the working operations.

19 Claims, 23 Drawing Figures

INVENTOR
BENGT E. H. NYMAN

BY Bauer & Goodman

ATTORNEYS

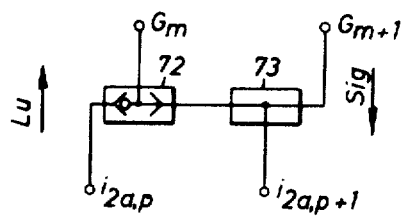
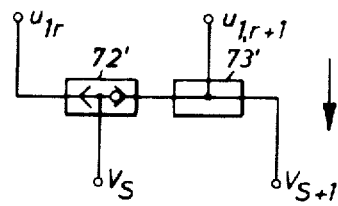
*FIG. 9a*  *FIG. 9b*
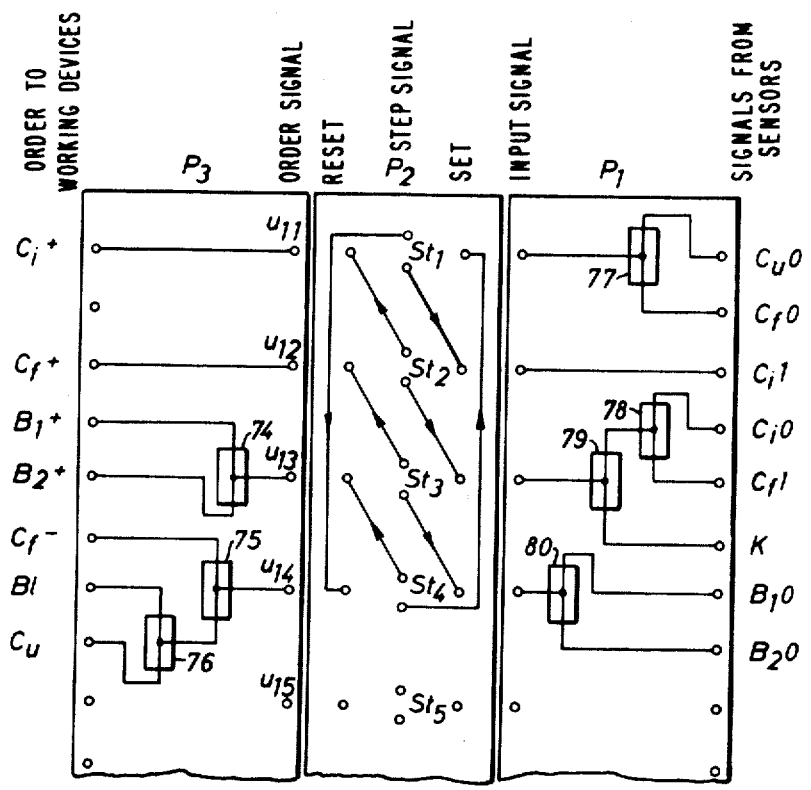
*FIG. 10*

PROGRAMMABLE SEQUENTIAL CONTROL MEANS HAVING A PLURALITY OF CONTROL CIRCUITS FOR CONTROLLING A RESPECTIVE PLURALITY OF DISCRETE SUBOPERATIONS

BACKGROUND OF THE INVENTION

This invention is directed to a control system for sequential control of such events or operations which only have to be started and then continue by themselves until they either are stopped by themselves or stopped by the control system. Examples of such operations are working operations which are carried out in production plants by multioperation working machines or a plurality of machines, where the working operations have to be started, carried out and stopped in a certain sequence or in certain sequences. Sometimes such operations are independent and sometimes they are dependent on each other as to starting and stopping points of time, and sometimes series of operations must go on simultaneously. In this latter case it can be an advantage, both for technical reasons and for simplicity of description to divide a sequence into subsequences.

Control of large production plants with very many operations can be done by computers, which method is preferable if flexibility is desired. Often there is also the possibility to use specialized or "tailor made" control systems, but these systems do not give any flexibility for variations in the production, and such systems are expensive because they must be specially constructed or "tailored" for various plants.

Control of small production plants or parts of a production plant, for example a single multioperation machine or a few machines at a production line, often is carried out by specialized control systems, which give very little flexibility for changes in production. Computing or data machines for control are out of the question in such cases, as computing machines then are too expensive.

There exist programmable control devices which can be used for sequential control and which give some flexibility. But with the existing programmable control devices all composite working operations must be decomposed in their components, which operation components must be ordered specifically one by one from the control device. A result of this is that very many signal connections are needed between the control device and the working devices of the controlled process and that each such operation must be carried out in many steps. And in general these programmable control devices cannot control simultaneous sequences which are independent of each other. Besides, sophisticated devices are often needed for signalling from the sensors of conditions, for example positions, in the process to the inputs of the control device, for example when a final position coincides with a starting position. Accordingly, no programmable sequential control system has been hitherto available, which is simple in construction and sufficiently flexible in use, for control of a moderate number of operations.

SUMMARY OF THE INVENTION

The present invention relates to a means or system for step by step control of a sequence of events or working operations and in particular to programmed control of specialized automates, i.e., special machines which are constructed to carry out several working operations on each workpiece automatically.

Sequential control is previously known per se, and sequential control devices are commercially available in a plurality of different shapes.

Automatic control of for example machining processes is achieved by means of either specially made, "tailor made," or programmable control devices. By a "specially made" or "tailor made" control device is here meant a control system which is constructed for a particular machine or a particular kind of job. Specially made control systems are usually constructed of details with simple functions, and by use of specially made control systems each application calls for individual construction of the control system. Construction and installation of such control systems requires qualified and specially educated and trained personel, and because such control systems very often are very complicated and laborous to construct, even if the controlled sequence contains a small number of steps, application of such control systems often requires a time consuming and expensive construction and installation work.

The working means and devices and their activating means of the machines and apparatuses which are to be controlled in many cases occupy the same position or condition previous to and after a working operation, e.g., in controlling a drilling machine. Simple position sensing means therefore cannot in such a case recognize the situation previous to and the situation after a working operation. In known systems for sequential control it is therefore required to either decompose the working operations into simple activities or events, each of which requires an order signal from the control system, or to include additional components into and/or in connection with the control system. An example of such decomposing into simple activities is the following: Drilling of a hole by means of a drilling machine can be done by the activities: fast feeding of the drilling machine to its working position, start of the drilling machine, feeding the drilling machine forward at a working rate and finally returning the drilling machine to its original position. So, the number of control steps and stages in known control systems has to be high, or extra components are required, or both.

Known programmable control systems are in general not capable of controlling sequences which are going on simultaneously and are independent of each other, and signals of continuous type, so called D.C.— or resting signals, often cause problems in such systems and require special solutions, which make programming more difficult.

Programmable control systems must be reprogrammed, when changes are to be done in the controlled process. By known programmable control systems which can be compared to the control system according to the present invention, the programming requires a relatively great effort by qualified and skilled personel. Known programmable control systems are therefore expensive in use, as relatively many hours of skilled work are required for programming and coupling and testing of programs.

One object of the present invention is to achieve a programmable control system which eliminates the deficiencies mentioned above.

Another object of the invention is to achieve a programmable control system which is specially suitable for replacing specially made control systems.

Still another object of the invention is to achieve a programmable control system which is reliable, comparably simple to install and so simple to program that relatively unskilled personel easily can do programming and coupling of programs.

These and other objects are obtained by means of a programmable control means, which comprises at least one program device, at least one control circuit, signal connections or communication paths and peripheral equipment, e.g., sensors, detectors, valves, etc., whereby the control circuit or the control circuits and the program device preferably are arranged in close contact with each other in such a manner that they together form a control unit.

As to the parts of and handling and generating signals said control circuit can be divided into an input or logic part, a memory part, which is controlled by said logic part, and an output part, which is controlled by said memory part. Said control circuit has at least three different inputs. One of these inputs will be called the "set input," the other "signal input" and the third "reset input." Said control circuit further preferably has two outputs. One of these outputs will be called "order output" and the other "step output."

Said set input and signal input are connected with and control the logic part, and said reset input is connected to the memory part for zero setting or resetting the memory part by means of a step signal related to that order signal which belongs to the next step in the sequence.

The main characterizing feature of the control means according to this invention is that the logic part of said control circuit is so constructed that input signals applied concurrently to both said set input and said signal input cause generation of a signal from said logic part to said memory part only if the input signal of said set input occurs previous to the input signal of said signal input. A preferred embodiment of the invention comprises a plurality of control circuits, which preferably are similar to each other with regard to their logic and memory parts. Said control circuits preferably are identical to each other as to outer dimensions and shape and arranged together in a "control box," so that they form a modular control unit, in which each control circuit is a module. Such a module will be called a "step module," because each such module is connected with one step of the controlled sequence or sequences.

A particularly preferred embodiment of the invention comprises a control unit containing a plurality of control circuits and a program device which comprises three program means. One of said program means is the carrier or the support of an input program which can be changed, the second program means carries a fixed or changeable step program, and the third program means carries a changeable output program. It is expedient to mount this program device on said control box.

Said input program comprises signal paths between the sensing and detecting means of the working process and said signal inputs as well as program components which are needed for achieving the desired input conditions for each control circuit. Said step program comprises signal paths which pass directly between the various control circuits from the step output of a control circuit to the set input of the next circuit and to the reset input of the nearest previous control circuit in the step sequence of the control circuits, which step sequence thereby is determined by the step program. Said output program comprises signal paths between the order output of the various control circuits and activating means of the various working means and devices in the working process and program components for achieving the desired output conditions.

When using any of the embodiments which are mentioned above each control circuit or step module is related to one step in the sequence which is to be controlled or one step in some or more of the sequences which are to be controlled by control of simultaneous sequences. Each step of the controlled sequence or sequences can consist of a subsequence, that is to say a series of activities, events or working operations. The special logic conditions which are formed in each control circuit make it possible that only one single order is required from a control circuit and that only one signal is required from the sensor for sensing the state of a working device to a control circuit for each subsequence, even if the subsequence is comprised of a subcycle, that is to say a subsequence with the same starting and final position for the activating means and the sensors which correspond to such a step of the sequence.

By use of said specially preferred embodiment the succession of the steps can be chosen by programming, that is to say that the succession according to which the various control circuits are to be activated can be chosen at will. Thus it is possible to have jumps over steps, returns to steps, repeats and alternatives.

In cases when only so called "straight forward step succession" is in question, that is to say that the succession of working condition for the control circuits coincides with the order of the control circuits in the control unit, it is expedient to use a step program means with fixed signal paths corresponding to a straight forward step program.

A control means according to the invention gives a plurality of advantages. The number of signal leads to and from the control unit is decreased in comparison to the number which is required when using conventional control means, because the control unit according to the invention does not have to receive a signal from a condition or position sensing means for every single activity or partial movement within a step in the sequence. Naturally any single activity or partial movement has to be ordered and then sensed or detected somehow while using the control means according to the invention as well as when using conventional control means. But, when using a control means according to the invention it is possible to allow successive activities within a working operation to control each other directly without any other influence from the control unit than that the control unit starts the first of these activities and receives a signal from a sensor after the last activity within the operation. These activities then together form a step of the sequence. So, one realizes that also the number of steps in the sequence and the number of orders from the control unit are lower by control of a number of working operations by means of a control means according to the invention than said numbers are when conventional means are used. This in its turn contributes to that the logic information handling is simplified.

The invention can be used universally for control of sequences of operations, and, above all, the process of problem solving, which any control system requires, is simplified.

The sequential control means according to the present invention thus is a much more simple control means for the user than previously known sequential control means both with regard to installation and use and especially with regard to the programming.

Other objects and advantages of this invention will become apparent from the following detailed description taken in conjunction with the attached drawings.

BRIEF DESCRIPTION OF THE DRAWINGS

FIG. 7a shows a preferred embodiment of a step module containing a control circuit according to FIG. 4a;

FIG. 9a and 9b show symbols for and schematic examples of use of two types of pneumatic program components, which can be used in forming input and output programs;

FIG. 10 shows a part of a filled in program form;

FIG. 11b shows the working order or succession of the step modules according to the program of FIG. 11a; and FIG. 11c shows a filled in program form which concerns the program of FIG. 11a.

DETAILED DESCRIPTION

Figure 1:
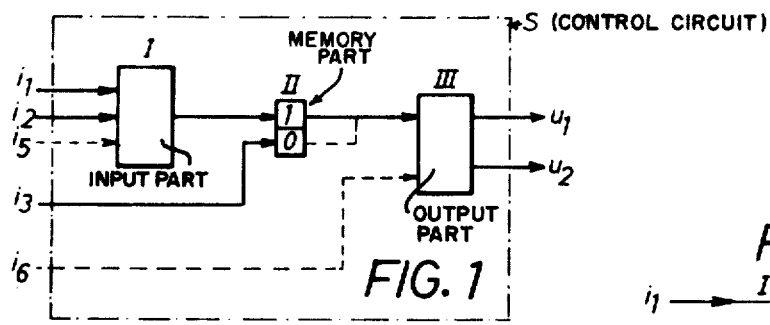
FIG. 1 is a block diagram of a control circuit or a step module according to the invention.

As can be seen from FIG. 1 of the drawings the logic or input part of the control circuit has the reference character I, the memory part has the reference character II and the output part the reference character III. Said logic part besides having a set input $i_1$ and at least one signal input $i_2$ preferably also has a start input $i_5$ for manual control of the control circuit and start of the control means. The output of the logic part is connected to the 1-input of the memory part II. The memory part controls the output part III either via its 1-output or its O-output depending on the number of inversions in the control circuit. The output part is preferably also provided with an input $i_6$ for manual control of the output part. Said output part preferably also has two outputs. One of these outputs, which is called the "order output" and has the reference $u_1$ on the drawing, is arranged to deliver order signals either directly or indirectly via activating means to working means in the working process.

The other output, which is called "step output" and has the reference $u_2$ on the drawing, is used for achieving the step function of a control means according to the invention, as will be described more in detail in connection with FIG. 5.

Figure 2D:
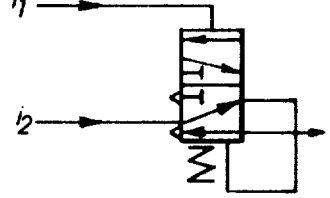
FIGS. 2a –2e show circuits of principle for different embodiments of the input part I according to FIG. 1.
Figure 2A:
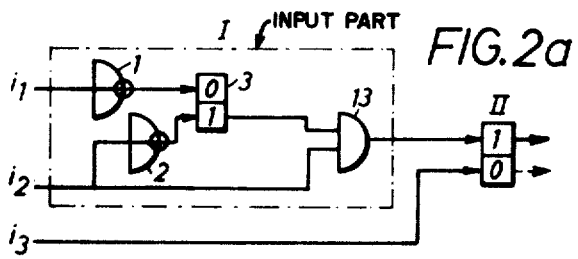
Figure 2E:
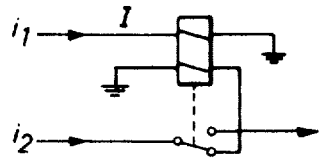
Figure 2B:
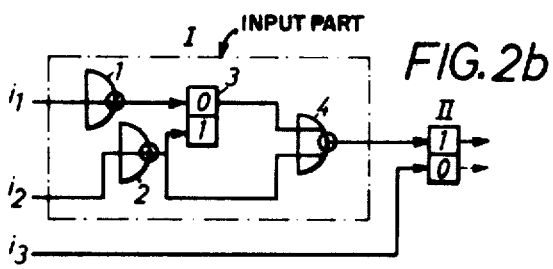

FIG. 2a and 2b are logic circuit diagrams which explain the principle of the logic or input part I. Both circuits comprise two inverters 1 and 2 and a bistable circuit 3. The logic part of FIG. 2a also comprises an AND-gate 13 with two inputs, while the logic part of FIG. 2b has a NOR-gate 4 with two inputs. One of said inverters is connected to the set input $i_1$ with its input and to the 0-input of the bistable circuit 3 with its output. The second inverter 2 is connected with its input to the signal input $i_2$ and to the 1-input of the bistable circuit 3 with its output. In FIG. 2a the 1-output of the bistable circuit 3 is connected to the second input of the AND-gate 13, and in FIG. 2b the 0-output of the bistable circuit 3 is connected to one of the inputs of the NOR-gate 4. The second input of the gate 13 of FIG. 2a is connected directly to the signal input $i_2$ and the second input of the gate 4 of FIG. 2b is connected to input $i_2$ via NOR-gate 2. From FIG. 2a it can be seen that the logic part sets two conditions for an output signal to be delivered from the logic part to the memory part. One of these conditions, which one for simplicity may be called the "primary condition," implies that input signals must be present simultaneously on both the set input $i_1$ AND the signal input $i_2$. The second condition, which for simplicity may be called the "secondary condition," implies that the input signal of the set input must be present previous to the input signal at the signal input. One then has presumed that the bistable circuit 3 is of such a type that it is held by the signal which arrives first in a state which is determined by this signal. The input signals can be of either the level type or the pulsed type.

In FIG. 2b the function of the AND-gate 13 is replaced by two inversions and a NOR-function. One of the inversions is obtained in that the 0-output of the bistable circuit 3 is used instead of the 1-output, and the other inversion is carried out by the inverter 2.

Figure 2C:
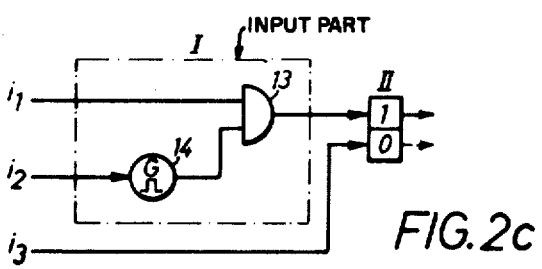

FIG. 2c shows a simpler input part, which comprises a trigged pulse generator 14 and an AND-gate 13. In this circuit the secondary condition is achieved in that the pulse generator 14 is responsive only to or is fed with either negative or positive signal jumps depending on whether the sensor which is connected to the signal input $i_2$ delivers a negative or positive going signal when the corresponding working device occupies its final position after a working operation. The AND-condition of this circuit is achieved in the same way as in the circuit of FIG. 2a directly by means of an AND-gate 13.

FIG. 2d shows a simple way of achieving the logic conditions, i.e., the AND-condition plus the secondary condition, by means of a pneumatic, four-way valve having two control inputs and return by means of a spring. From FIG. 2d one also can see that an output signal is obtained if the signal of the set input $i_1$ arrives previous to the signal of the signal input $i_2$ and if both signals thereafter are simultaneously (or concurrently) present.

FIG. 2e shows a circuit having a relay with two windings for achieving the logic conditions. The set signal is fed to one of the windings and the sensor signal to the other winding in such a way that said two signals oppose each other in the relay. With substantially the same magnitude of both signals the relay will not be activated, if the sensor signal arrives before the set signal. So, also this circuit delivers an output signal only if the set signal arrives first and if both the set signal and the sensor signal thereafter exist simultaneously.

Figure 3A:
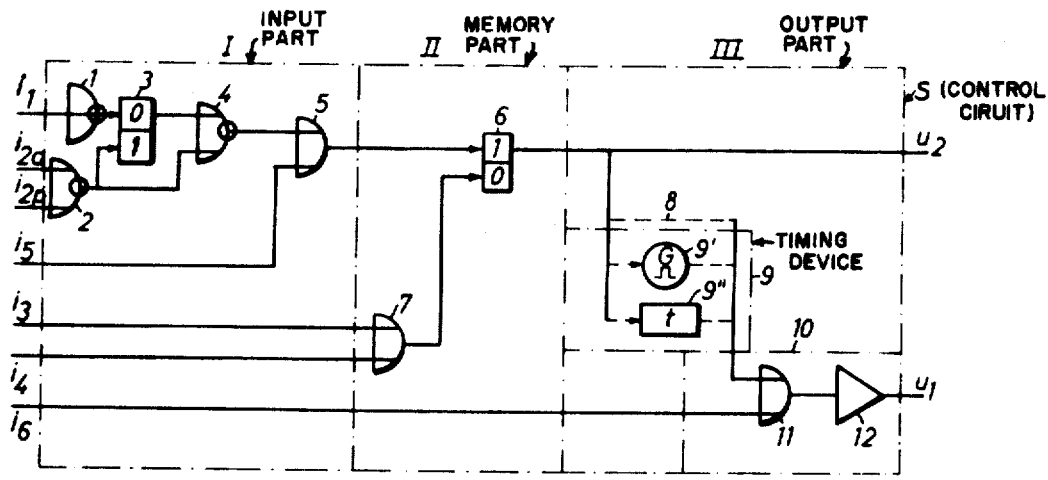
FIG. 3a and 3b are logic circuits of two preferred embodiments of a control circuit or step module.

In the logic circuit diagram of FIG. 3a the input part I is essentially the same as in FIG. 2b. An OR-gate 5 has been inserted between the NOR-gate 4 and the memory part II to make it possible to arrange an input $i_5$ for manual control of the memory part II of the control circuit and to start the control means. The control circuit has two inputs for sensor signals, one of which is an active input $i_{2a}$ and the other is a passive input $i_{2p}$, which inputs will be described in more detail in connection with FIG. 4a. The memory part II consists of a bistable circuit or a memory 6 and an OR-gate 7 with two inputs $i_3$ and $i_4$ for zero- or resetting of said memory 6. The extra reset input $i_4$ is used in a modular control unit for centrally fed zero- or resetting. That is, reset input $i_4$ provides a resetting signal which is fed from a central location which is common to all modules, when starting the control means, to make sure that all the control circuits of the control means are reset at the start of the control means. The memory 6 is connected with its 1-output to the output part III, whereby the 1-output is connected directly to the step output $u_2$ as well as either directly by means of a signal lead 8 or indirectly via a pulse generator 9 to an amplifying device 10, which comprises an OR-gate 11 with two inputs followed by an amplifier 12. The output of said OR-gate 11 is connected to the input of the amplifier 12, the output of which is the order output $u_1$ of the control circuit.

The second input of the OR-gate 11 serves as said input $i_6$ for manual control of the output part III of the control circuit. By manual control via said input $i_6$ an output signal is obtained only on the order output $u_1$ and not on the step output $u_2$. The timing device 9 can be used for pulsing the output signal, this being symbolized by a pulse generator 9' in the drawing, or to delay the output signal, this being symbolized by a delay means 9'' on the drawing. Said timing device can be replaced with a device which gives a direct connection between the memory part II and said amplifying device 10, this being indicated on the drawing by a bypass connection 8.

The logic circuit diagram of FIG. 3a is very well fit for realization by means of fluidistors and other pneumatic components.

Figure 3B:
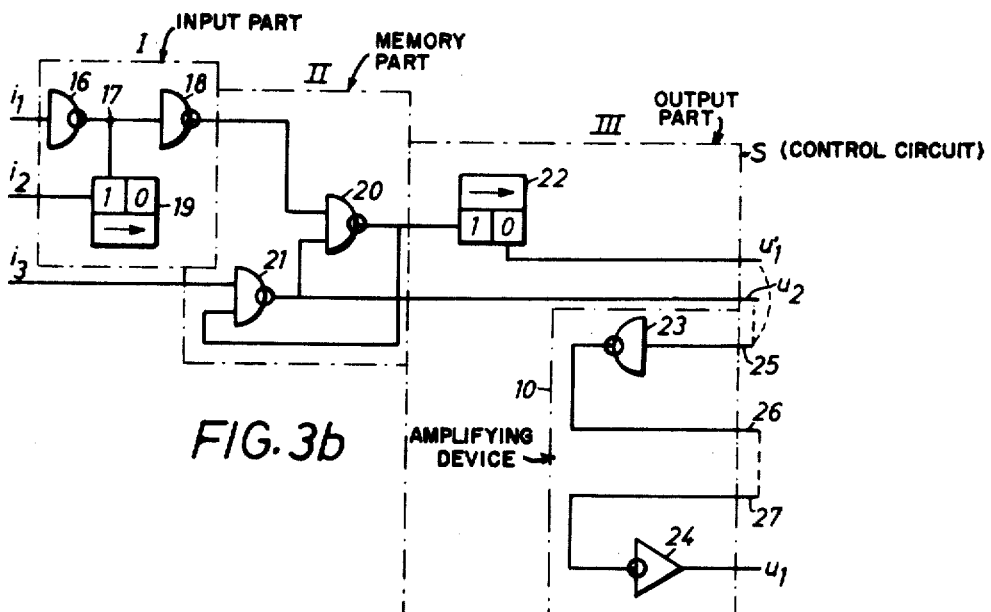

FIG. 3b shows a circuit diagram of a control circuit which is suitable for realization by electric or electronic, preferably integrated, circuits, for example monolithic circuits. The logic part of this control circuit comprises two inverters 16 and 18 and a monostable circuit 19, for which the stable condition is denominated its 0-condition. The input of the inverter 16 forms the set input $i_1$ of the control circuit, and the trigger input of the monostable circuit 19 forms the signal input $i_2$ of the control circuit. The output of the inverter 16 and the 1-output of the monostable circuit 19 are interconnected in a point 17. This interconnection point 17 is connected to the input of the inverter 18. By means of the interconnection 17 an AND-condition is achieved without the use of extra gates for this. Said set input $i_1$ is arranged to respond to a negative signal jump, and said signal input $i_2$ is arranged to respond to a positive signal jump. The memory part II of said control circuit consists of a bistable circuit having two NAND-gates 20 and 21 in a well known connection. The bistable circuit II has two trigger inputs and two outputs. One of the trigger inputs is connected to the output of the inverter 18, and the other trigger input is the reset input $i_3$ of the control circuit. One of the outputs of the memory part is connected to the trigger input of a monostable circuit 22 of the output part III for causing a pulsed output signal. The stable state of said monostable circuit may be called its 0-state. The corresponding 0-output serves as an extra order signal output $u_1'$. The second output of the memory part II serves as the step output $u_2$ of the control circuit. For amplifying the order signal the output part also is provided with an amplifying device, which comprises an inverting buffer stage 23 and an inverting amplifier 24 in cascade, whereby the output program is inserted between the output 26 of said inverter 23 and the input 27 of said amplifier 24. The input 25 of said inverter 23 is connected via an outer coupling either to the extra order signal output $u_1'$, if a pulsed output signal is desired, or to the step output $u_2$, if a continuous output signal is desired.

Figure 4A:
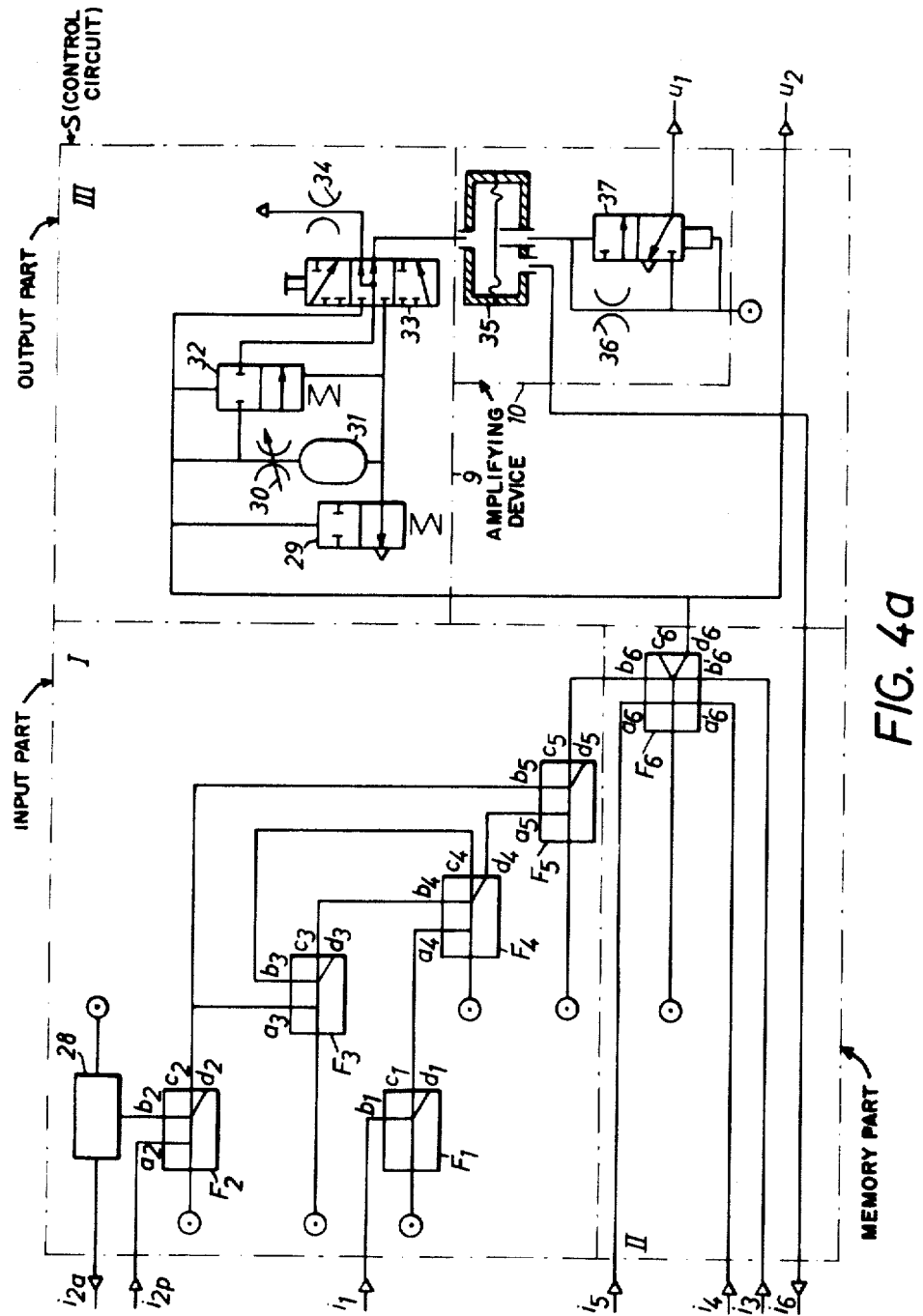
FIG. 4a is the circuit of a control circuit comprising fluidistors and other pneumatic components.

The control circuit S which is shown in FIG. 4a, corresponds to the logic circuit diagram of FIG. 3a. The logic and memory parts I and II of this control circuit together consist of an integrated circuit having six fluidistors $F_1 - F_6$, and the output part III consists of other types of pneumatic components. Said fluidistor $F_1$ corresponds to the inverter 1, the fluidistor $F_2$ corresponds to the inverter 2, the fluidistors $F_3$ and $F_4$ together form a bistable circuit, which corresponds to the bistable circuit 3, and the fluidistor $F_5$ corresponds to the NOR-gate 4 according to FIG. 3a and FIG. 2b. Said fluidistor $F_6$ corresponds partly to the bistable circuit 6 of said memory part and partly to the OR-gates 5 and 7 according to FIG. 3a. The step output $u_2$ of the control circuit can be connected either directly to the output $d_6$ of the fluidistor $F_6$, as is shown in FIG. 4a, or to an amplifier, e.g., a fluidistor $F_7$ (not shown in the drawing), which receives its input signal from the fluidistor $F_6$.

From FIG. 4a it can be seen that the fluidistor $F_2$ has two inputs $a_2$ and $b_2$. Input $a_2$ is connected to the passive input $i_{2p}$ of the control circuit. An input signal to this input $i_{2p}$ is achieved by means of appropriate sensors which indicate that the air has a predetermined control pressure or so called "low pressure." The other input $b_2$ of the fluidistor $F_2$ is connected to a venturi or ejector element 28, which, on the one hand is fed with pressurized air and on the other hand is connected to the input $i_{2a}$ of the control circuit, input $i_{2a}$ in this manner being an active input, which implies that an input signal occurs at this input by breaking the air flow which flows out of the input $i_{2a}$ when no input signal is present. Said air flow can be broken for example by a sensor valve which tightens a signal lead which is connected to the input $i_{2a}$, whereby a pressure rise occurs at the input $i_{2a}$ without supplying air via said sensor valve. Such an active input gives the possibility of using simpler sensors, gives a more reliable function and is far better from a safety point of view than a passive input. In one embodiment of the invention the passive input has been removed completely. This embodiment is not shown in the drawings.

The advantage of using a venturi or ejector element 28 for achieving an active input is that longer signal leads can be allowed than if a branching is used to this end.

The logic and memory part according to FIG. 4a is best described through the following signal or truth table (page 19a), where each fluidistor has two to four columns for input and output signals. The inputs of the fluidistors are designated with $a$, $b$, $a'$ and $b'$, the outputs of the fluidistors are designated with $c$ and $d$, and these designations also have got an index which corresponds to the index of the designations of the fluidistors. Even the fluidistor $F_7$, which is mentioned above is included in the table.

The output $d_6$ of the fluidistor $F_6$ is connected to the step output $u_2$ as well as either directly to an amplifying device 10 or to a timing device 9, which is arranged to control the amplifying device 10, the output of which is the order output $u_1$ of the control circuit. The timing device 9 comprises a controllable exhaust valve 29 having a return spring, a time circuit comprising a choke device 30 in series connection with a volume 31, a controllable valve 32 for pulsing the output signal and a choke device 34. In practice the timing device is constructed as a single component or unit. The timing device 9 can be used either for delaying or pulsing the output signal. These two possibilities together with the possibility of direct connection between the fluidistor $F_6$ and the amplifier 10 is indicated by the symbol of a valve 33 having three positions. In the indicated position the valve 33 is connected to give a pulsed output signal. If the valve symbol is moved upward, so that the lower square of the valve symbol replaces the center square, the valve is connected to delay the output signal, and if the valve symbol is moved downward, so that the upper square replaces the center square, the valve gives a direct connection between the fluidistor $F_6$ and the amplifier 10. In practice the latter situation is obtained by taking the timing device away from the step module and replacing it with another unit having substantially the same outer shape and dimensions as the timing device and having a channel which gives a direct connection between the fluidistor $F_6$ and the order output $u_1$. To change the timing device from a pulse device into a delay device is done by changing the timing device itself.

The amplifying device 10 in FIG. 4a consists of a pilot valve 35, which is fed with pressurized air via a choking device 36, and a controllable valve 37, which has two positions and which is arranged to be controlled by the pilot valve 35 in such a manner that the valve 37 causes a signal on the order output $u_1$ in response to the output signal of the fluidistor $F_6$. Said pilot valve has an input, which is connected to the timing device 9 and an output, which is connected to the valve 37, as well as an active input, which constitutes said input $i_6$ for manual control of the amplifying device 10 by means of an operating means, by means of which the air flow from said input $i_6$ can be stopped.

Figure 4B:
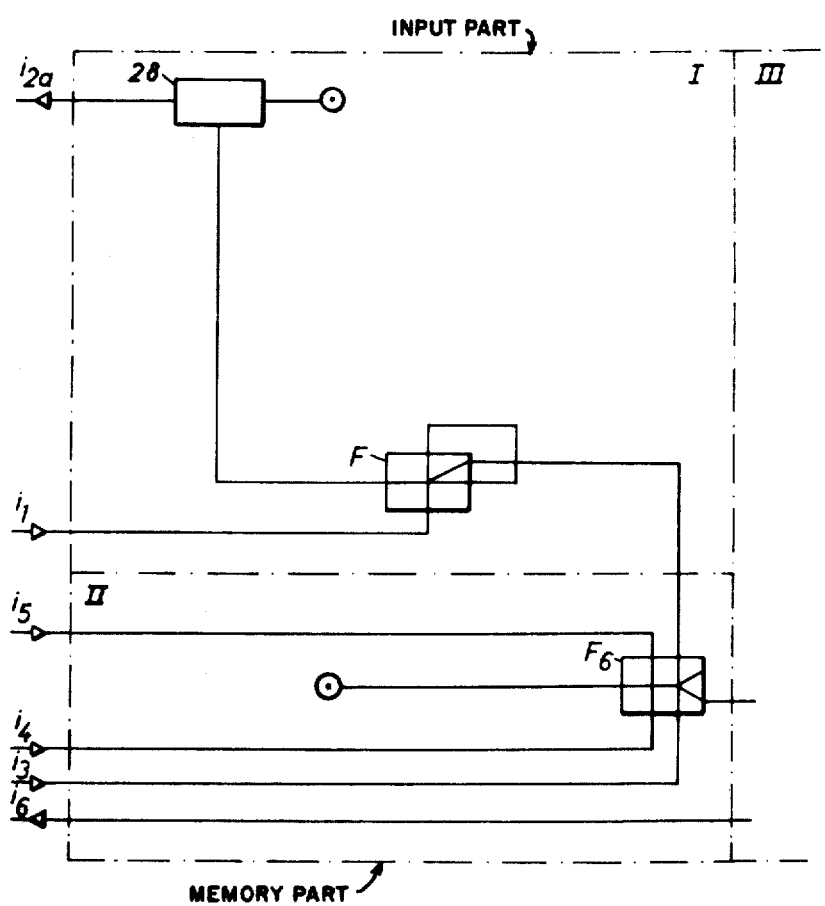
FIG. 4b is a control circuit, where the input or logic part is comprised of a single fluidistor.

In the control circuit which is shown in FIG. 4b, the fluidistors $F_1 - F_6$ of FIG. 4a are replaced by a single fluidistor F. Said fluidistor F can be of a proportional or analogue type in contrast to the fluidistors $F_1 - F_6$, which should be of the switch type. A feed-back from one of the two outputs of said fluidistor to one of its three inputs causes blocking holding and no other response to other signal conditions than the signal condition which is stated above, so that the fluidistor delivers a signal via its second output to the memory part II only if the set signal occurs previous to the sensor signal and both signals thereafter are present simultaneously. The control circuit has an active sensor signal input $i_{2a}$ and no passive sensor signal input. In this embodiment, as in the embodiment of FIG. 4a, the input $i_6$ is an active input, while the other inputs $i_1$, $i_3$, $i_4$ and $i_5$ can be passive inputs. The output part III of the control circuit according to FIG. 4b suitably is similar to the output part according to FIG. 4a.

Figure 5:
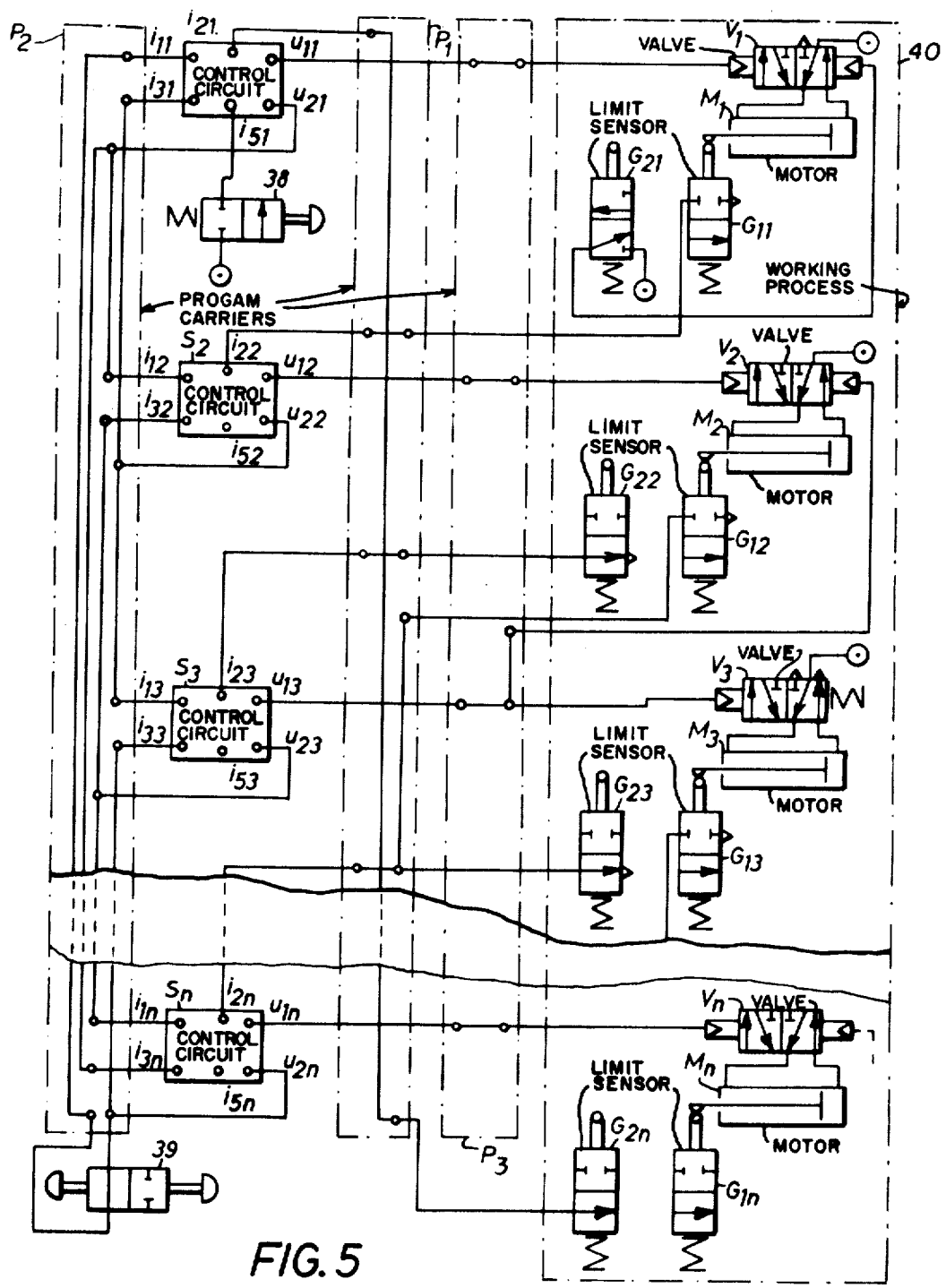
FIG. 5 is a block diagram of a modular control means, and FIG. 5 also shows an example of control of a working process or sequence containing a certain number of steps.

The control means of FIG. 5 comprises a number n of control circuits or step modules $S_1$, $S_2$ ... $S_n$. The program of said control means is divided in three parts, namely an input program, a step succession program and an output program, which programs are arranged separately on corresponding program means or program carriers $P_1$, $P_2$, $P_3$, respectively, by means of signal leads and program components. A hand valve 38 is arranged for start of the control means, and a hand valve 39 having two stable states makes it possible to choose between automatic repetition of the controlled sequence and automatic stop of the control means after having passed through the sequence once. The sequence or working process 40, which has been chosen

TABLE

| | Modul signals | | | | | | | | | | | | | | | | |
|---|---|---|---|---|---|---|---|---|---|---|---|---|---|---|---|---|---|
| | $i_2$ | | | | $i_1$ | | | | | | | | $i_3$ | | $u_2$ | | |
| | Fluidistor | | | | | | | | | | | | | | | | |
| | $F_2$ | | $F_3$ | | $F_1$ | | $F_4$ | | | | $F_5$ | | | $F_6$ | | $F_7$ | |
| In and outputs | $b_2$ | $c_2$ | $a_3$ | $b_3$ | $c_3$ | $b_1$ | $c_1$ | $a_4$ | $b_4$ | $c_4$ | $d_4$ | $a_5$ | $b_5$ | $c_5$ | $a_6$ | $b_6$ | $d_6$ | $b_7$ | $d_7$ | Remarks |
| The table is valid in the direction of the arrow only. ↓ | 0 | 1 | 1 | 0 | 0 | 0 | 1 | 1 | 0 | 0 | 1 | 1 | 1 | 0 | 0 | 1 | 0 | 0 | 0 | $i_1=i_2=0$, $i_3=1$(start). |
| | 0 | 1 | 1 | 0 | 0 | 0 | 1 | 1 | 0 | 0 | 1 | 1 | 1 | 0 | 0 | 0 | 0 | 0 | 0 | $i_1=i_2=i_3=0$. |
| | 0 | 1 | 1 | 1 | 0 | 1 | 0 | 0 | 0 | 1 | 0 | 0 | 1 | 0 | 0 | 0 | 0 | 0 | 0 | $i_1=1$ firstly. |
| | 1 | 0 | 0 | 1 | 0 | 1 | 0 | 0 | 0 | 1 | 0 | 0 | 0 | 1 | 1 | 0 | 1 | 1 | 1 | $i_2=1$ secondly. |
| | 0 | 1 | 1 | 0 | 0 | 0 | 1 | 1 | 0 | 0 | 1 | 1 | 1 | 0 | 0 | 0 | 1 | 1 | 1 | $i_1=i_2=0$. |
| | 0 | 1 | 1 | 0 | 0 | 0 | 1 | 1 | 0 | 0 | 1 | 1 | 1 | 0 | 0 | 1 | 0 | 0 | 0 | $i_3=1$. |
| | 0 | 1 | 1 | 0 | 0 | 0 | 1 | 1 | 0 | 0 | 1 | 1 | 1 | 0 | 0 | 0 | 0 | 0 | 0 | $i_1=i_2=i_3=0$. |
| | 0 | 1 | 1 | 1 | 0 | 1 | 0 | 0 | 0 | 1 | 0 | 0 | 1 | 0 | 0 | 0 | 0 | 0 | 0 | $i_1=1$ firstly. |
| | 1 | 0 | 0 | 1 | 0 | 1 | 0 | 0 | 0 | 1 | 0 | 0 | 0 | 1 | 1 | 0 | 1 | 1 | 1 | $i_2=1$ secondly. |
| | 1 | 0 | 0 | 1 | 0 | 1 | 0 | 0 | 0 | 1 | 0 | 0 | 0 | 1 | 1 | 1 | 0 | 0 | 0 | $i_1=i_2=i_3=1$. |
| | 0 | 1 | 1 | 0 | 0 | 0 | 1 | 1 | 0 | 0 | 1 | 1 | 1 | 0 | 0 | 0 | 0 | 0 | 0 | $i_1=i_2=i_3=0$. |
| | 1 | 0 | 0 | 0 | 1 | 0 | 1 | 1 | 0 | 1 | 1 | 1 | 0 | 0 | 0 | 0 | 0 | 0 | 0 | $i_2=1$ firstly. |
| | 1 | 0 | 0 | 0 | 1 | 1 | 0 | 0 | 1 | 0 | 1 | 1 | 0 | 0 | 0 | 0 | 0 | 0 | 0 | $i_1=1$ secondly. | as an example, does not require any jumps, repeats or alternatives as to selection of control circuits. Said control means therefore operates according to a straight forward step succession. So, the step program is connected as a straight forward program, and each of the control circuits is associated with a corresponding step in the sequence. The working device of each step of the sequence is a motor, which on the drawing has been indicated as a linear motor or a pneumatic cylinder. Each motor has the reference character M and an index which indicates the number of the step in the sequence. The activating means for each motor consists of a directional valve, which has the reference character V and an index corresponding to the number of the corresponding step. Each step or stage comprises a limit sensor for sensing the starting position and a limit sensor for sensing the foremost position of the motor, which sensors are designated with $G_1$ and $G_2$, respectively, and a second index corresponding to the number of the step. The terminals of the control circuits have the same reference characters as in FIG. 4a and furthermore a second index corresponding to the number of the control circuit, which in the selected example is equal to the number of the corresponding step in the sequence.

The dividing into three parts of the total program and the special logic of the control circuits result in very uncomplicated program components and a very simple programming.

The control means in FIG. 5 operates as follows. Suppose that the control means has been connected to its air supply. Then each control circuit occupies its zero or starting position, which implies that none of the control circuits delivers an output signal, that is $u_1 = u_2 = 0$ if the signals are given the same denominations as their corresponding terminals. To start the control means a signal is given by means of the valve 38 to the start input $i_{s1}$ (corresponding to $i_s$ in FIGS. 3a and 4a) of the first control circuit $S_1$. The start inputs of the rest of the control circuits are not used in this example. Said first control circuit $S_1$ then delivers an output signal or order $u_{11}$ via the output program to the directional valve $V_1$, which activates the motor $M_1$. At the same time, the control circuit delivers a step signal $u_{21}$, which goes via the step program to the set input $i_{12}$ of the next control circuit $S_2$ in the sequence, for which said step signal is the set signal. The step signal $u_{21}$ is also fed and to the reset input $i_{3n}$ of the "preceding" control circuit $S_n$, for which said step signal is the reset signal. As the working device $M_1$ of the first step has a starting position which is equal to the final position when the order arrives, there is a signal on the input $i_{22}$ of the control circuit $S_2$ when the set signal arrives to the input $i_{12}$. This does not satisfy said secondary condition, and therefore the control circuit $S_2$ remains in its starting or resting position. When the motor $M_1$ gets into its foremost position, the limit sensor $G_{21}$ delivers a reset signal to the directional valve $V_1$, which results in that $M_1$ returns to its starting position. And that completes the first step of the sequence. This step also may serve as an example of a subsequence, which in this case consists of a subcycle as the final position coincides with the starting position, and which contains the two activities: forward movement and return of the motor $M_1$. Thanks to the secondary condition the next control circuit $S_2$ is able to discriminate between the beginning and the end of the subsequence. So, the control circuit $S_2$ does not start until the position sensor $G_{11}$ again delivers a signal to the signal input $i_{22}$, whereby this control circuit delivers an order signal $u_{12}$ and a step signal $u_{22}$. The order signal $u_{12}$ goes to the directional valve $V_2$, which activates the motor or cylinder $M_2$. The step signal is passed to the input $i_{31}$ of the control circuit $S_1$ and resets this circuit, i.e., resets its memory part, as well as to the input $i_{13}$ to prepare the third control circuit $S_3$ in such a manner that this circuit will respond to a sensor signal. When the motor $M_2$ operates the position sensor $G_{22}$, the control circuit $S_3$ receives input signals which satisfy the secondary condition, whereby $S_3$ is activated. Then the preceding control circuit $S_2$ is reset and the next control circuit $S_4$ (not shown) receives a set signal from the output $u_{23}$. From the output $u_{13}$ a signal or order is delivered to the directional valve $V_3$ with the result that the motor $M_3$ starts. This signal is also passed to the directional valve $V_2$ of the preceding step, where it serves as a reset signal for $V_2$ with the result that the motor $M_2$ returns. The valve $V_3$ is reset by means of a return spring when the signal $u_{13}$ disappears.

This example thus also demonstrates three different ways for resetting the directional valves. $V_1$ is reset by means of a signal from the limit sensor $G_{21}$ belonging to the same step as the directional valve $V_1$. The second directional valve $V_2$ is reset by means of an order from the control circuit $S_3$ belonging to the next step of the sequence. And the third directional valve $V_3$ is reset, as has already been mentioned, by means of the return spring of this valve. Of course other combinations are possible, especially by irregular step succession.

For example the directional valves or activating means $V_1$ and $V_2$ should be of a bistable type. To use bistable activating means gives the advantage that pulsed order signals can be used and the advantage that a memory function is obtained. Besides, if pulsed order signals are used, a bistable activating means can be operated back to its starting position at any moment, except during the order pulse time, without regard to the condition of that control circuit which is arranged to give the working order to said activating means.

It is possible to use bistable activating means and pulsed order signals in the majority of control problems. The output program becomes simpler, if bistable activating means and pulsed order signals are used, and this is of special advantage by simultaneous sequences and also by other types of irregular step succession.

Only the active signal input of the control circuits is used in the example which has been described above.

FIG. 5 also shows an example of forming an AND-condition in the input program. The fourth control circuit $S_4$ shall not start until the sensor $G_{12}$ indicates that the motor $M_2$, which belongs to the second step, again has taken its starting position AND the sensor $G_{23}$ indicates that $M_3$, which belongs to the third step, has taken its foremost position. Through this measure it is checked that the order which is given by the third control circuit $S_3$ is carried out.

The branching of the signal from the output $u_{13}$ is an example of output programming.

The active condition of the control circuits is moved step by step from one control circuit to the next one until the active condition reaches the last control circuit $S_n$. If the hand valve 39 occupies the position which is indicated on the drawing, the sequence will be repeated. If the valve 39 is thrown into its other position, the stepping will be stopped when the last control circuit $S_n$ has given its order, as the signal path between $u_{2n}$ and $i_{11}$ then is broken.

Figure 6:
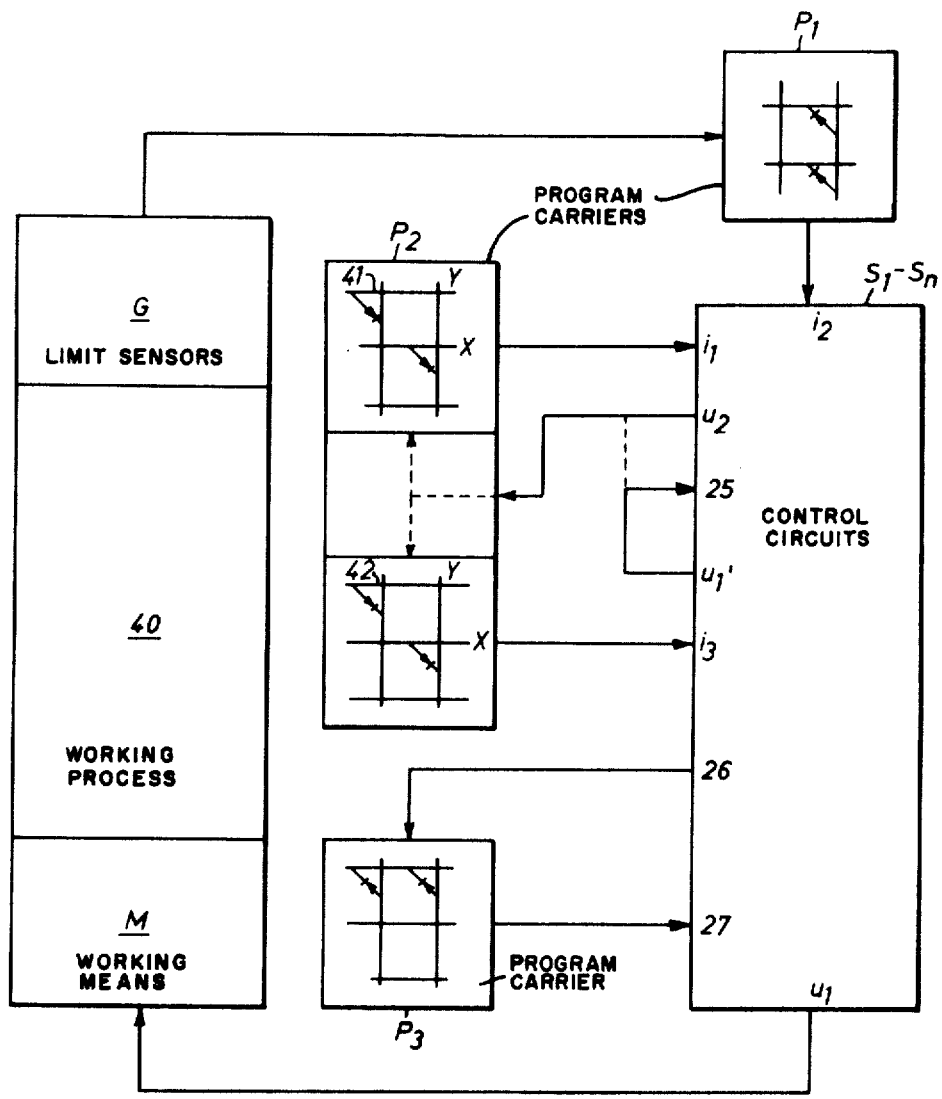
FIG. 6 is a simplified block diagram of another modular control means according to this invention for control of a working process.

FIG. 6 is a simplified block diagram of a control means having electronic control circuits $S_1 - S_n$ according to FIG. 3b, program means $P_1$, $P_2$ and $P_3$ and limit sensors G and working means M of a working process 40. The input program comprises a diode matrix of a type which is known per se, the step program contains two diode matrixes 41 and 42 and the output program also contains a diode matrix.

To start the electronic control means of FIG. 6 the memory part II of the chosen control circuit is manually activated by means of a signal which is fed to the output $u_2$ of this control circuit. The activated control circuit then gives an order via its order output $u_1$ to the corresponding working device, for example a magnet valve. At the same time a step signal is delivered from the step output $u_2$. The step outputs $u_2$ of the control circuits are connected to a contact plane X having parallel contact rails in the diode matrixes 41 and 42. In another contact plane Y the contact rails run at a right angle to the rails in the X-plane. The rails are isolated from each other. By means of diode plugs the step output of each control circuit is connected to one or more set inputs and to one or more reset inputs, whereby the set inputs and the reset inputs are to be chosen with one restriction: one may not choose a set input and a reset input of one and the same control circuit.

By regular or straight forward step succession the activated control circuit delivers a reset signal to the preceding control circuit or step module and a set signal to the next control circuit.

The next control circuit of the sequence is activated by means of an input signal which is formed by one or more sensor signals, whereby the sensors for example consist of micro-switches. The input conditions of each control circuit can be programmed by means of the diode matrix of the input program $P_1$. The diode matrix of the output program $P_3$ makes it possible to let each control circuit activate one or more working devices simultaneously. Continuous or pulsed output signals may be selected by connecting either the step output $u_2$ or the extra order output $u_1'$ to the terminal 25 (compare FIG. 3b) by means of a set of buttons (not shown).

Figure 7A:
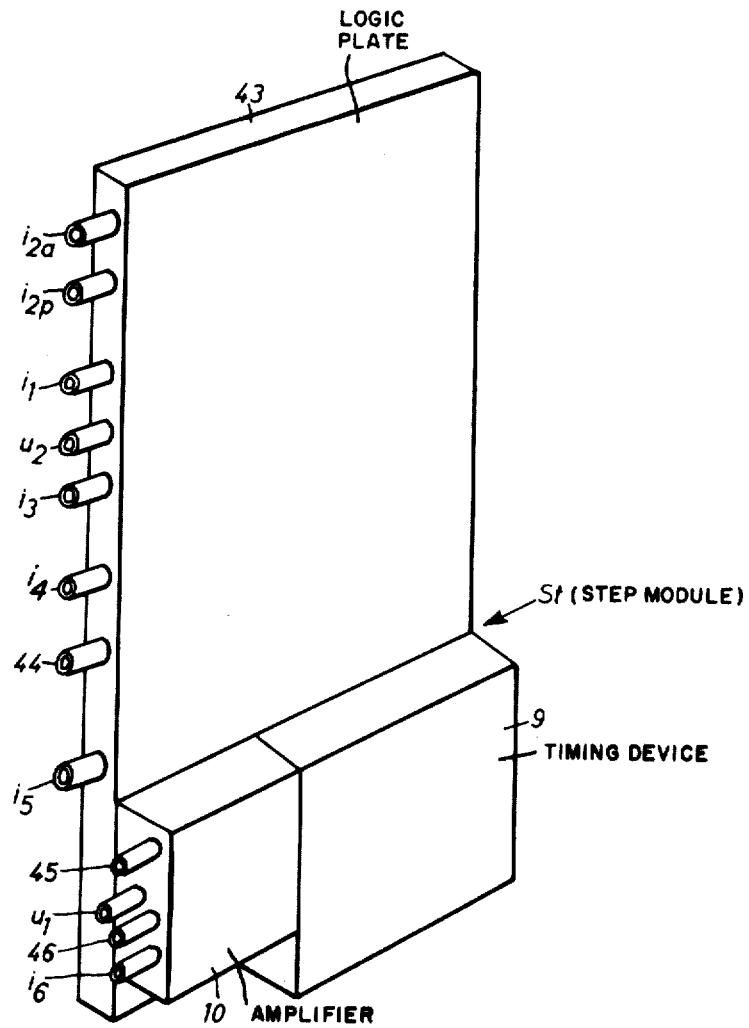

FIG. 7a is a perspective view of a step module St comprising a control circuit with a circuit diagram according to FIG. 4a. The logic and memory part consists of an integrated circuit, which comprises fluidistors $F_1 - F_6$ and which has the shape of a rectangular plate, which for convenience may be called a "logic plate" 43. The timing device mentioned above is mounted on the outside of said logic plate together with a pressure amplifier 10. When the timing device is not needed, it is replaced by another unit of the same dimensions. The timing device and the amplifier are mounted on the logic plate in such a way that the signal connections between the integrated circuit and the timing device and between the timing device and the amplifier are established by the mounting.

Connection terminals for connecting signal leads are provided on the front part of the logic plate 43 and the pressure amplifier 10 together with terminals for supplying high and low pressure air and for exhausting or evacuating. The terminals have the following order from the top end to the bottom end of the module: active input $i_{2a}$, passive input $i_{2p}$, set input $i_1$, step output $u_2$, reset input $i_3$, start reset input $i_4$, terminal 44 for supplying low pressure air, manual start input $i_5$, terminal 45 for supplying high pressure or working air, order output $u_1$, evacuating terminal 46 and manual order input $i_6$.

Figure 7B:
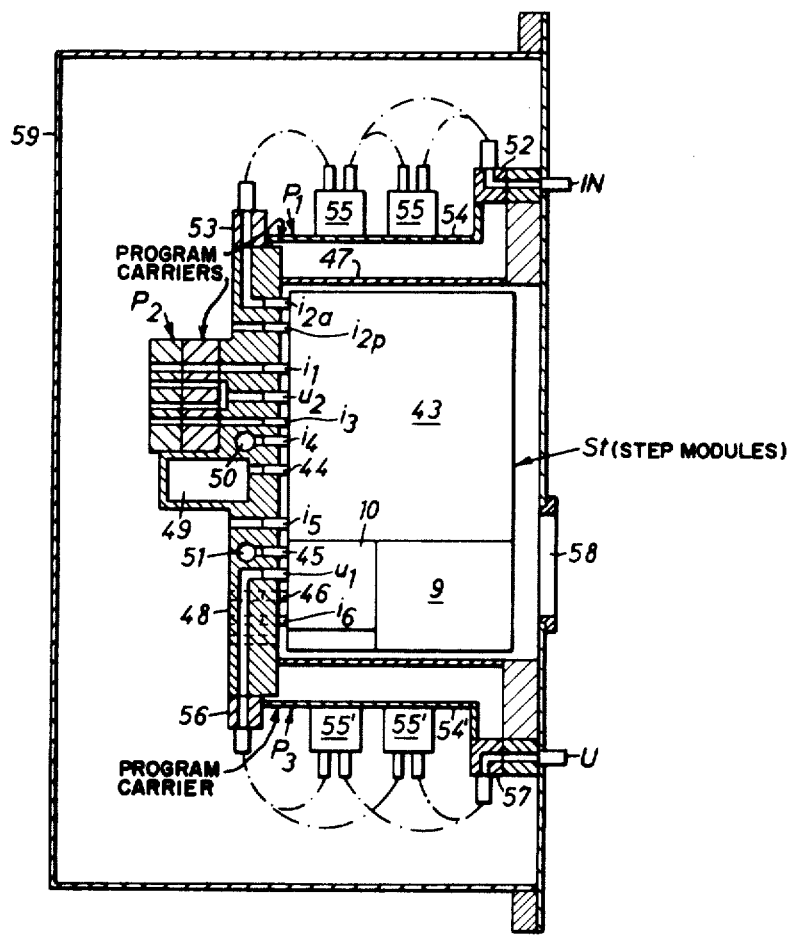
FIG. 7b shows a modular control unit in section, which control unit contains step modules according to FIG. 7a in an inner box, which serves as a support for the program device.

Step modules according to FIG. 7a are used in the modular control means according to FIG. 7b, which shows said control means in section and seen from one side. Step modules St are arranged in an inner box 47, which has a front plate 48 that serves as a support for all the step modules. Said front plate contains a channel 49 for common supply of low pressure air to the fluidistors of all step modules, a channel 50 for common start reset of all step modules and a channel 51 for common supply of high pressure or working pressure air to the pressure amplifiers. Said front plate further contains separate channels for input and output signals for each step module. The orifices of the channels are so arranged that the connecting terminals of the step modules are connected with their respective channels when mounting the step modules in the inner box 47.

FIG. 7b also shows that the program means $P_1$, $P_2$ and $P_3$ are mounted at the inner box 47. The input program means $P_1$ is mounted at the upper part of said box, the output program means $P_3$ at the lower part and the step program means $P_2$ at the front plate. The input program means $P_1$ of FIG. 7b comprises two rails or so called program rules 52 and 53 and a thin flat piece 54, which is provided with a plurality of holes for mounting of the program components 55 which are needed for coupling of a program. Said program rules have channels which lead to corresponding connecting terminals which are used in the coupling of a program. When mounting said input program means it should be arranged in such a way that each channel in one program rule 52 leads to another channel which in its turn leads to a connection terminal IN which is mounted at the outside of the box and which is intended for connection of an input signal lead, i.e., a signal lead from one of the sensors, and in such a way that each channel in the other program rule 53 is connected to such a channel in said front plate as leads to the signal input of a step module. Said output program means $P_3$ has a similar construction as said input program means $P_1$ and has two program rules 56 and 57 which are provided with channels leading to corresponding connecting terminals and a thin flat piece 54' for mounting of program components 55'. Said channels in said program rule 56 are connected to the order outputs of the step modules and said program rule 57 has connections to outside connecting terminals U, the latter being the order outputs of the control unit for connecting order signal leads which lead to activating means of the working process. Said step program means $P_2$ has a rule provided with channels which lead to corresponding connecting terminals at the front side and which on the rear side lead to channels in the front plate, which latter channels lead to corresponding step outputs, set inputs or reset inputs. At least two connecting terminals are arranged for each step output, as is shown in FIG. 7b. For coupling or setting up a step succession program no extra program components are needed except for signal leads, if it is assumed that each channel of the step program means is branched to a sufficient number of connecting terminals and that non-return valves are considered as a part of said step program means.

Said box 47 has an air outlet which is provided with a slow resistance in the form of a pelletized washer 58, which restricts the air flow out of said box, so that the pressure in the box will be a little higher than the outside atmospheric pressure. This overpressure effectively prevents dust from getting into the box from the outside, which gives the advantage that this control unit can be used in dusty working places without any problems.

The complete control unit is enclosed by an outer box 59. Such operating means as are needed for operating the control means are placed either at the outer box or in a separate operational unit.

Figure 7C:
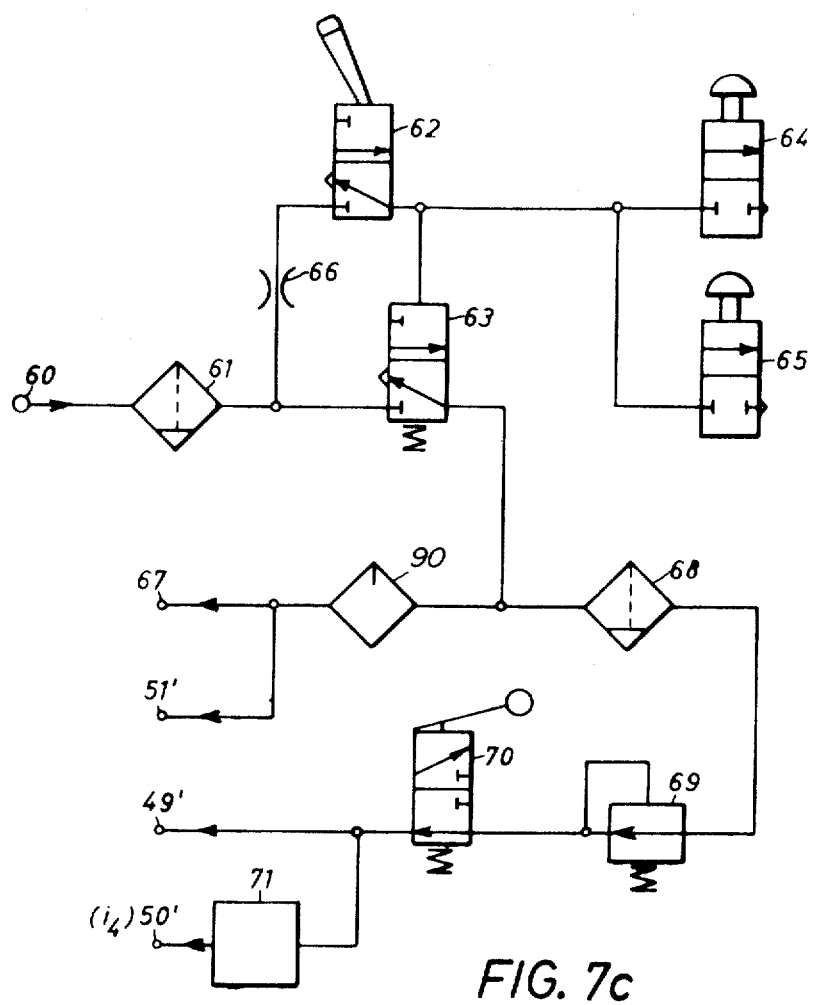
FIG. 7c shows a circuit diagram of the air supply to the control means according to FIG. 7b.

To obtain smooth and well defined magnitudes of the times and velocities which are formed pneumatically, a constant pressure level is required both for low pressure air and working pressure or high pressure air. Certain requirements as to the purity of air must be satisfied; if not dust and oil in the pressurized air shall cause constipation of the orifices of the fluidistors. Besides, all the modules must get a start reset signal when the air supply is turned on, so that the memory condition for sure is 0. An air supply which meets all these requirements is shown in FIG. 7c. Pressurized air is supplied via a connection 60 and a filter 61 to a controllable valve 63 having spring return. Said controllable valve 63 is controlled by signals from a double throw valve 62, which serves to switch on and switch off the system, or signals from a stop button 64 or an emergency stop button 65. A restriction 66 is inserted in the lead to said double throw valve 62, so that the stop button or the emergency stop button can be able to operate said valve 63, even if the valve 62 is switched on. When the controllable valve 63 is switched on, air is passed through an oil mist lubricating device 90 to a connection 67 intended for the working valves and to a connection 51' intended for the pressure amplifiers, and air is also passed through another filter 68, a reduction valve 69 and a switch valve 70 to a connection 49' intended for the fluidistors and also via a pulse device 71 to a connection 50' intended for start reset. Said switch valve 70 is combined with those operational valves which are connected to the input $i_6$ of the step modules and which are used for manual operation of output parts of the step modules, so that these switch valves are switched off when the switch valve occupies the position which is indicated on the drawing. Said pulse device 71 is so constructed that it automatically generates a start reset pulse when the air supply is switched on. This pulse device has no other function until the next time the system is switched on.

Figure 8A:
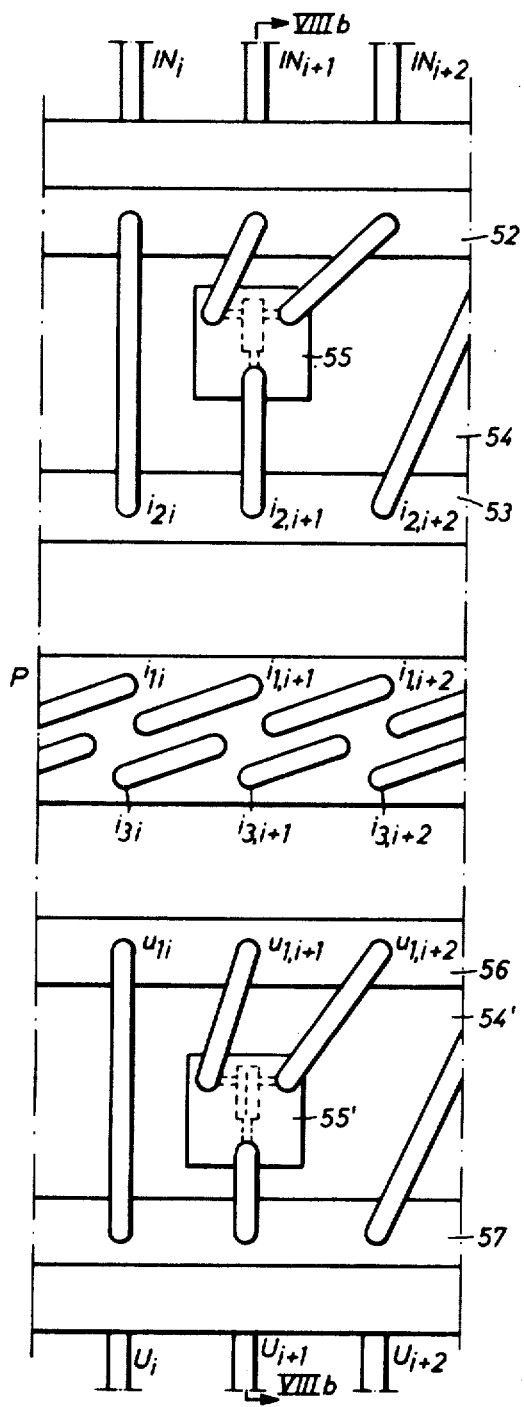
FIG. 8a and 8b show a program device of a similar type as is used in the control means according to FIG. 7b, the program device of FIG. 8a and 8b having a different construction than the program device which can be seen on FIG. 7b.
Figure 8B:
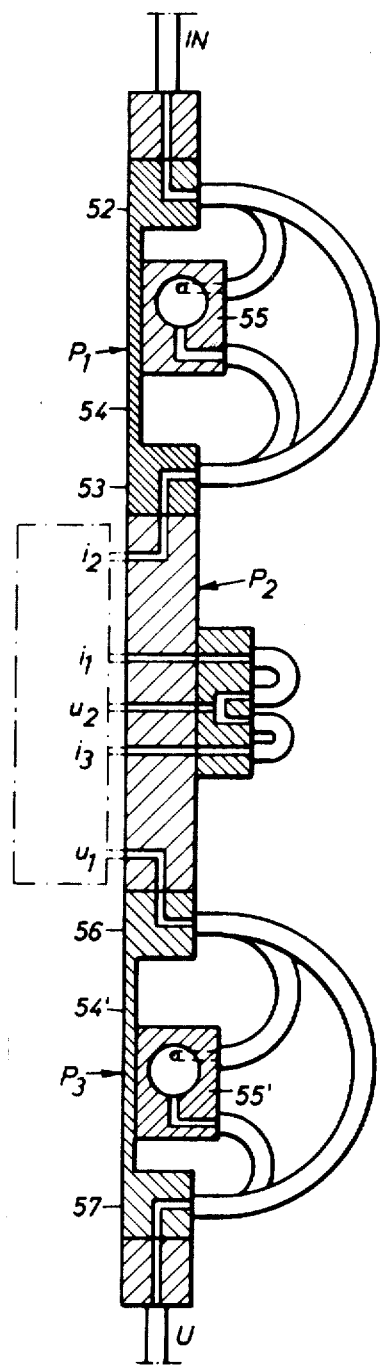

FIGS. 8a and 8b show a part of a program device P, which has all its three program means $P_1$, $P_2$ and $P_3$ in one plane and which is constructed to be mounted on the front plate of a control means according to FIG. 7b. The shown part of the program device P extends over three steps corresponding to three step modules, for example step modules number $i$, $i+1$ and $i+2$. The terminals at the top of FIGS. 8a and 8b are the inputs $IN_i$, $IN_{i+1}$ and $IN_{i+2}$ of the control means. These input terminals are to be connected to corresponding sensors of the working process, and they are connected to the connecting terminals of the rule 52 of the input program means $P_1$. On the flat piece 54 of the program means $P_1$ there is indicated a program component 55, which gives an AND-condition in the input program, namely that both the input $IN_{i+1}$ AND the input $IN_{i+2}$ must receive a sensor signal before any signal is transmitted from the AND-component 55. At the center part of FIGS. 8a and 8b there is shown the step succession program means $P_2$, which has a set input channel for each set input $i_1$, a step output channel for each step output $u_2$ and a reset input channel for each reset input $i_3$. On FIGS. 8a and 8b the step output channel is branched in such a way that it is connected to two connecting terminals on the program side. In another embodiment each step output channel is branched in such a way that it is connected to a group of five connecting terminals on the program side. Said set input and reset input channels are branched in the same way to corresponding groups of connecting terminals, each group having four terminals. A group of this type is represented by one connection on FIG. 8a. The branchings can of course also be achieved by means of outside components. The connecting terminals of the branchings of the step output channels are provided with non-return valves. These non-return valves are used by irregular step succession and/or by step repeats to prevent step signals from spreading to the wrong set and reset inputs via step outputs of other step modules. (Non-return valves are needed either in connection with the step outputs or in connection with the set and reset inputs, but the indicated solution requires the lowest number of non-return valves).

The lower part of FIG. 8a shows a part of the output program means $P_3$ with its rules 56 and 57 and its flat piece 54', at which a program component 55' is fixed, which gives an OR-condition to the output program. At the bottom of FIG. 8a connecting terminals are indicated, which terminals form the outputs $U_i$, $U_{i+1}$ and $U_{i+2}$ of the control means and which are connected to corresponding connecting terminals at the rule 57 of the output program means $P_3$.

When connecting said program means to said front plate elastic packing elements are used. Sufficient tightning pressure is obtained by means of a small number of screws, and this gives the advantage that programs can be changed quickly, when it is desired to change a program.

A program is formed by coupling flexible tubes, for example plastic tubes, between the terminals of the program means and between the terminals of the program means and the program components.

One realizes that technically there is a need of combining the sensor signals to AND- and/or OR-conditions in this control system to achieve new orders. This forming of conditions is preferably distributed in such a way that the desired AND-conditions together with possible branchings are arranged in the input program, while OR-conditions are formed in the output program.

Only two types of program components are needed: branchings and switching valves (shuttle valves). Arranged in one direction in relation to the signal direction the branchings are used for forming AND-conditions, and arranged in the opposite direction in relation to the signal direction they are used as branchings. A switching valve is for example used when a sensor signal from a certain sensor occurs in more than one step or when a working valve is to be controlled from more than one module.

FIG. 9a shows examples of the use of such program components 72 and 73 in the input program. 72 designates a switching valve and 73 designates a branching. The switching valve is preferably of the so called foil type. With the switching valve in one of its positions a limit sensor $G_m$ is able to activate the active input $i_{2a,p}$ of a step module $S_p$, which corresponds to the following logic function: $i_{2a,p} = G_m$, if the corresponding signals are given the same denominations as the terminals or the sensors. With the switching valve in its other position, as in FIG. 9a, the active input $i_{2a,p+1}$ of another step module $S_{p+1}$ can be activated by simultaneous signals from $G_m$ and another limit sensor $G_{m+1}$, which corresponds to the following logic function: $i_{2a,p+1} = G_m \cdot G_{m+1}$. An arrow marked Lu indicates the direction of the air flow, and an arrow marked Sig indicates the signal direction.

FIG. 9b shows an example of using a switching valve 72' to obtain an OR-condition and an example of using a branching 73' in the output program. By means of the switching valve 72' is achieved that an order signal $u_{1r}$ from a step module $S_r$, or an order signal $u_{1,r+1}$ from another step module $S_{r+1}$ can activate a valve $V_s$, which corresponds to the following logic function: $V_s = u_{1r} + u_{1,r+1}$. Because of the branching 73' the order signal $u_{1,r+1}$ also is able to active the valve $V_{s+1}$. The direction of air flow here coincides with the signal direction which is indicated by an arrow.

Returning to FIG. 8a one can see that the shown part of the step program is connected for straight forward step succession, i.e., the succession of working condition for the step modules coincides with their consecutive order in the control unit, as the step output of each module is connected to the reset input of the adjacent step module on one side and to the set input of the adjacent step module on the other side. According to the circuit of the input program according to FIG. 8a an input or sensor signal at the input $I_i$, corresponding to for example the module $St_i$, causes that this step module $St_i$ delivers an order signal $u_{1i}$, which is sent via the output program to the output $U_i$ of the control unit. To activate the next step module $St_{i+1}$ it is required because of the branching 55 that an input signal must be present both at the input $I_{i+1}$ and at the input $I_{i+2}$ of the control unit, while the next step module $St_{i+2}$ for example can be imagined to be activated from an input signal at the input $I_{i+3}$. Because of the program component 55', which is a switching valve, an order signal is delivered via the output $U_{i+1}$ of the control unit, when the step module $St_{i+1}$ or when he step module $St_{i+2}$ is activated, while the output $U_{i+2}$ of the control unit may be imagined to be active for example when the step module $St_{i+3}$ is activated.

From what is said above it is clear that coupling of a program is very uncomplicated. However, also the programming itself is very simple, which is best shown by an example. A solution of a simple control or automation problem therefore will be described in the following part of the description. Objects of a certain shape are to be provided with two holes each, which can be done by the following working operation: (1) automatic feeding of an object into the machine, (2) locking-up, (3) control of the locking position, (4) drilling, (5) pushing the object out and (6) cleaning by blowing air on the object and return to point (1). Hereby the following working devices can be used: (1) a pneumatic cylinder $C_i$, (2) a second pneumatic cylinder $C_f$, (3) a valve V, (4) two automatic drilling units $B_1$ and $B_2$, (5) a third pneumatic cylinder $C_u$ and (6) a blowing nozzle B.

Based on this list of the working operations which are to be carried out a program is made. This program can consist of a list written in ordinary text or with abridgments or symbols for the various activities, subsequences and subcycles which together form the control sequence of events. A time-distance-diagram can be made instead of said list. This program is then brought over to or written on a special but uncomplicated program form, which is shown in FIG. 10. One starts by filling in all working orders which are needed to the left in FIG. 10. In the selected example these are: feed means forward ($C_i$+), starting locking-up means ($_f$+) drilling ($B_1$+ and $B_2$+), locking-up means return ($C_f$−), cleaning by blowing (B1) and pushing out ($C_u$). When filling in the program form the + is used to symbolize such orders as "forward," "start" or similar and the − is used for orders like "back," "stop" or similar. In this example the first step module $St_1$ is used for start of the feed means $G_i$. Accordingly a signal connection is drawn from the order output $u_{11}$ of this step module. The second step module $St_2$ is used for starting the locking-up means $C_f$. So, a signal connection is drawn from the order output $u_{12}$ of this module. If one chooses to have both drilling machines started by one module, a branching 74 is needed in the output program. The branching is drawn on the program form together with signal leads from the order output $u_{13}$ of the third step module $St_3$ to the branching 74 and from the branching to two output terminals. Return of the locking-up means $C_f$, cleaning by blowing and pushing out is for example controlled by the fourth step module $St_4$. Two branchings 75 and 76 are needed for this. Said two branchings 75 and 76 together with required signal leads are drawn. And that completes the circuit diagram of the output program $P_3$. At the same time also the step succession has been decided, which in this case is straight forward or regular. Therefore the circuit diagram of the step program $P_2$ is as shown in FIG. 10.

Thereafter the required conditions for the sensor signals are drawn on the program form. Previous to the start of the feed means $C_i$ the locking-up means $C_f$ and the push out means $C_u$ must have returned back to their starting or zero position. Signals for this are designated with $C_f0$ and $C_u0$ in FIG. 10, respectively. The locking-up means $C_f$ is activated when the feeding in of an object is completed. A sensor signal for this is designated with $C_i1$. The drilling machines are started and fed forward when the feed in means has returned to its starting position, the locking-up means has taken its forward position and the position of the locked-up object has been checked by means of a suitable sensing means. The signals for these activities are designated with $C_i0$, $C_f1$ and K, respectively. Return of the locking-up means, blowing and pushing are started by the fourth step module $St_4$ after the signals $B_10$ and $B_20$ have arrived and indicated that the drilling machines have returned to their initial positions. To obtain the AND-conditions of the input program branching components 77, 78 and 79, 80, which components are similar to the branching components 74, 75 and 76 of the input program. When these components together with the required signal leads are drawn on the program form also the circuit diagram of the input program $P_1$ is finished, and then the whole program is completed. The coupling of the program then can be done on separate input, step and output program means or on a combined program device as described previously.

As activating means for the working devices in this example it is expedient to use directional valves of a similar type as in FIG. 5, whereby the activating means for feeding in, drilling and pushing out may be coupled in the same way as the directional valve $V_1$ of FIG. 5, the activating means for locking-up as the directional valve $V_2$ and the activating means for blowing as the directional valve $V_3$.

From what is said above one realizes that subcycles require just one order each, while control of such means as the locking-up means requires two different order signals, namely one order signal when the object is to be locked-up and a second when the object is to be released. It is not possible, or at least very difficult, to construct a sensing means which is able to sense that the object has been cleaned by the blowing. The blowing therefore should be time controlled by arranging the timing device of the corresponding step module to deliver a pulse of suitable duration.

In the related example this pulsed order signal also is used to start the pushing out subcycle.

Another embodiment (not shown) of the step program means is provided with fixed signal connections in the form of inside channels for a straight forward step program and has no connecting terminals for outside coupling of said step program.

Figure 11A:
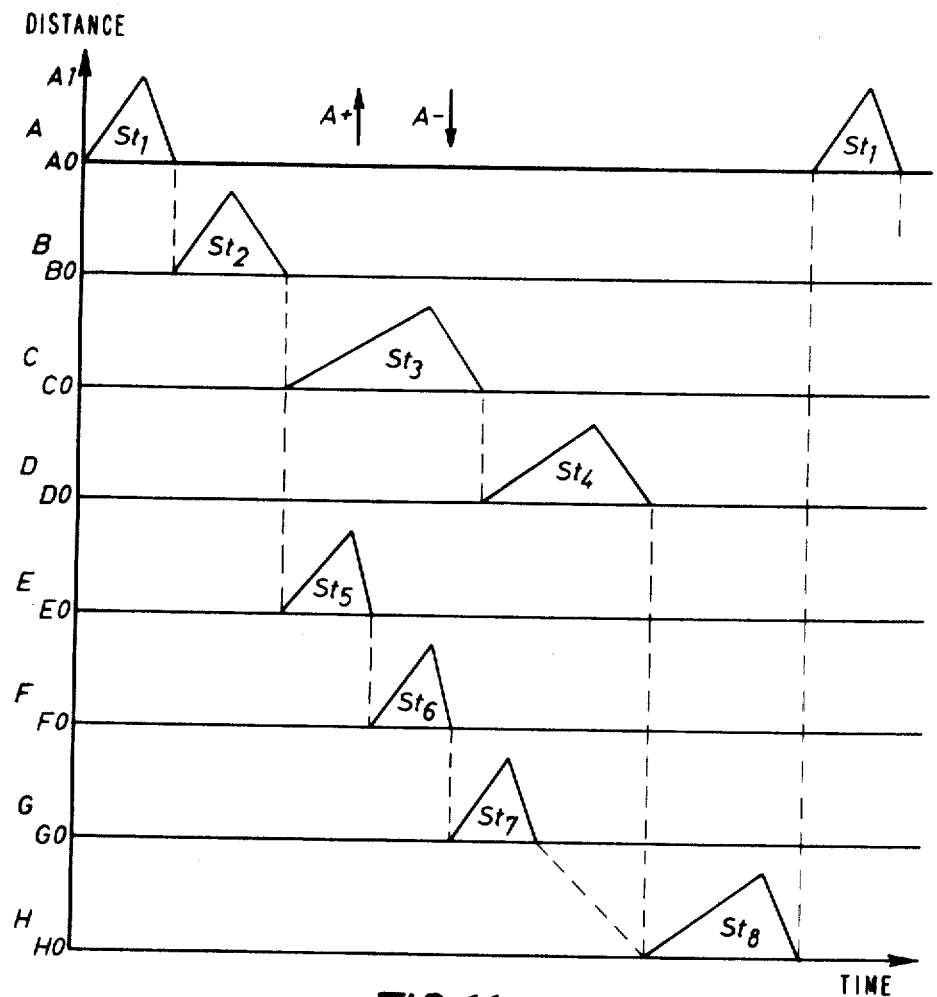
FIG. 11a shows a program in the form of a time-distance-diagram.
Figure 11B:
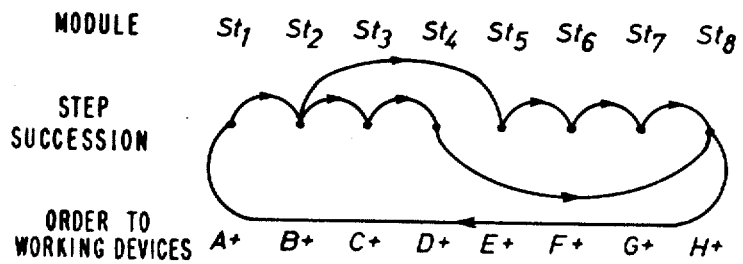
Figure 11C:
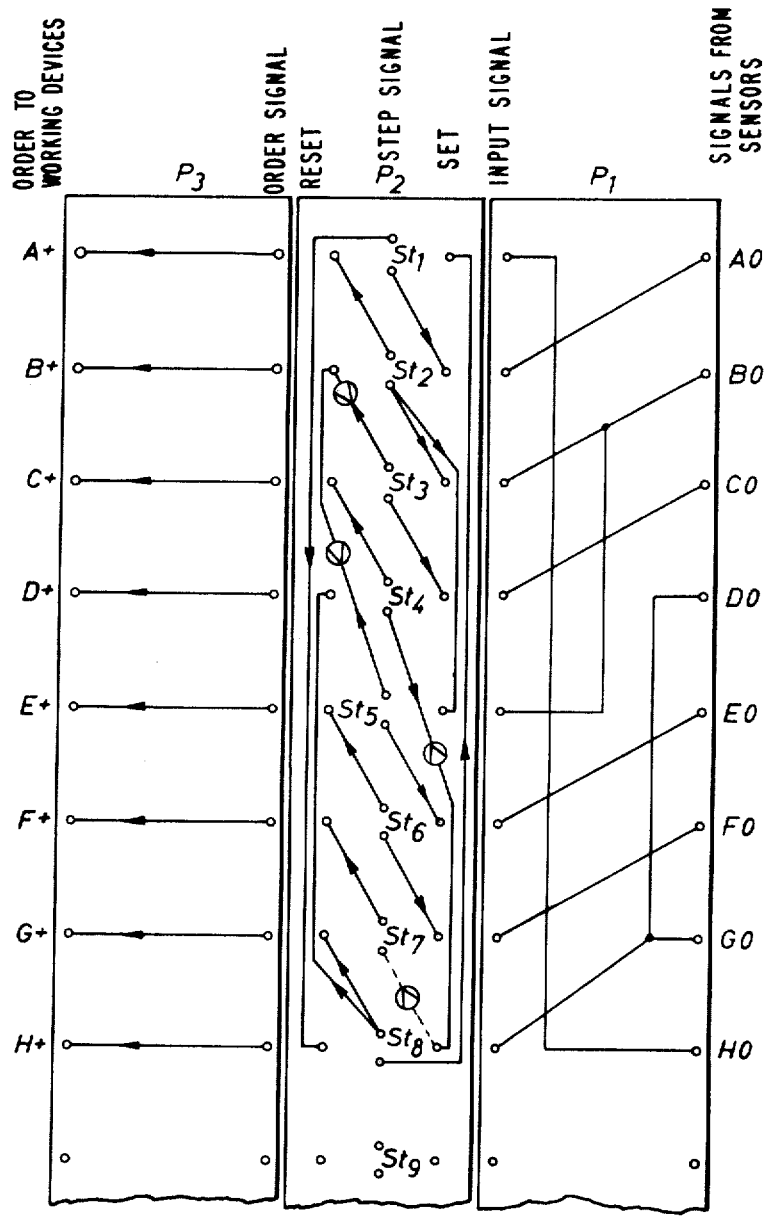

FIGS. 11a, 11b and 11c show an example of programming of a working process having two mutually independent and partly simultaneous sequences. FIG. 11a shows the program of said working process in the form of a time-distance-diagram. Those working means which participate in the process are denominated A, B, C, D, E, F, G and H, which denominations also are used for the corresponding steps of the sequences. The various steps are drawn below each other in the right order in time in relation to each other. The initial position of a working device is as previously designated with the denomination of the device and 0. The forward position of a working device is designated with the denomination of the device and 1. The corresponding sensor signals are given the same denominations as the corresponding positions of the working devices. The dependence between various steps in the sequences is indicated in the diagram by means of dash lines. Those control circuits or step modules which are used in control of the working process are set out at the top of FIG. 11b, and below there is drawn a schematic picture of the step succession, each step in the sequence symbolized by a dot. At the bottom of FIG. 11b those orders are indicated which are needed for starting the corresponding steps. It is also expedient to indicate how the step modules are related to the steps of the sequence in the corresponding time-distance-diagram as in FIG. 11a.

Filling in the program form of FIG. 11c is then done in the same manner as in the previous example: firstly the orders, secondly the circuit diagram of the step program is drawn and finally the sensor signals which are required. By means of a dash line between the step output of the step module $St_7$ and the set input of the step module $St_8$ it is indicated that no set signal is needed from $St_7$ to $St_8$, as the step G is completed before the step D according to FIG. 11a.

In the input program the dividing into two simultaneous sequences is seen by that the sensor signal BO goes to the step module $St_3$ as well as to the step module $St_5$, and in the same way one can see the combining into one sequence again by that the sensor signal DO and the sensor signal GO firstly are lead to an AND-component, and when both sensor signals BO and GO exist simultaneously the step module $St_8$ receives an input signal on its signal input.

The electronic control means according to the invention is programmed in substantially the same way even if the program components and the signal connections of the electronic control means are of other types.

The described control means can be used for many different applications of a sequential nature. The pneumatic embodiment of the control means is comparably unsensitive to awkward environments, which fact opens new fields of application where man now has to work in troublesome circumstances. However, the nearest field is automation of machine tools, where a great need exists of a simpler and more routine form of solving automation problems than what is available at present.

It should be understood that the foregoing description is intended to be merely illustrative of my invention and that other embodiments and modifications will be apparent to those skilled in the art without departing from its spirit.

I claim:

1. A sequential operation control means having a plurality of control circuits of which each control circuit controls only a single discrete suboperation and said control circuits are activated successively and singly in a step-wise manner to deliver an order signal corresponding to the suboperation assigned thereto in responding to receiving a sensor signal indicating a predetermined state of the suboperation assigned to a preceding control circuit in the succession, further comprising:

means for delivering concurrently with said order signal a set signal to the next control circuit in the succession; and a signal order discriminating subcircuit in each said control circuit responsive to the arrival of said set signal from a preceding control circuit and of said sensor signal from the suboperation being controlled by the said preceding control circuit, the latter control circuit being activated if, and only if, said set signal from said preceding control circuit is on before said sensor signal becomes concurrent therewith.

2. A sequential operation control means comprising: a plurality of control circuits, each of which controls only a single discrete suboperation and said control circuits are activated successively and singly in a step-wise manner to deliver an order signal corresponding to the suboperation assigned thereto, each control circuit including a logic section, a bistable memory section coupled to said logic section, an output section coupled to said memory section, said output section providing an order output signal and a step output signal in response to setting of said memory section, a first input and a second input connected to said logic section, a signal order discriminating circuit in said logic section responsive to the arrival of signals at both said first and said second logic circuit inputs for causing a set signal to be delivered from said logic section to said memory section if, and only if, the signal at said first logic circuit input is on before the signal at said second logic circuit input becomes concurrent therewith, and a third input coupled to said memory section for resetting said memory section;

means for supplying an operation sensor signal;

sensor signal program means coupled to said second input of said logic circuits and to said means for supplying said operation sensor signal, and including first means for selective interconnection thereof;

step signal program means coupled to said first input of said logic circuits, to said third input and to said step signal outputs of said control circuits, and including second means for selective interconnection thereof;

means for supplying an operation order signal; and output signal program means coupled to said order signal outputs of said control circuits, to said means for supplying said operation order signal, and including third means for selective interconnection thereof, to thereby control said suboperations.

3. Control means according to claim 2, wherein each of said control circuits have similar logic and memory sections and are constructed as control unit modules ($St; St_1, St_2, \ldots$).

4. Control means according to claim 2, wherein said logic section and said memory section of a control circuit are comprised of fluidistor means, and wherein said logic section includes at least one active input which is activated by signals from said sensing means, and including means for selectively blocking air flow from said active input.

5. Control means according to claim 4, wherein said logic section contains first through fifth fluidistor means of the OR/NOR-type, at least the third through fifth fluidistor means having a first (a) and a second (b) input and all fluidistor means having a first (c) and a second (d) output, and wherein said memory section includes a sixth fluidistor means of a bistable type, the first fluidistor means of said logic section being arranged to invert input signals fed to the first input of the control circuit and arranged to control the first input of the fourth fluidistor means of said logic section by its first output ($c_1$), which fourth fluidistor means via its second input ($b_4$) is controlled by the first output ($c_3$) of the third fluidistor means and which fourth fluidistor means via its first output ($c_4$) is connected to the second input ($b_3$) of the third fluidistor means and via its second output ($d_4$) to the first input ($a_5$) of the fifth fluidistor means, a second fluidistor means being arranged to invert input signals fed to either an active or a passive second input of the control circuit and arranged to control by its first output ($c_2$) the first input ($a_3$) of the third fluidistor means and the second input ($b_5$) of the fifth fluidistor means, whereby the third, fourth and fifth fluidistor means form said discriminating circuit for controlling the second input ($b_6$) of the sixth fluidistor means of said memory section.

6. Control means according to claim 4, wherein said discriminating circuit in the logic section of said control circuit is comprised of a single fluidistor means, and including a positive feedback means for blocking holding except when the signal fed to said first logic circuit input occurs earlier than the input signal fed to said second logic circuit input.

7. Control means according to claim 2, wherein said control circuit is comprised of electrical elements.

8. Control means according to claim 7 wherein:

said logic section of said control circuit comprises a first (16) and a second inverter (18) and a monostable multivibrator (19); said first inverter being arranged to be activated via the first input ($i_1$) of the control circuit by means of a negative going signal or lack of signal and said monostable multivibrator (19) being arranged to be triggered via the second input ($i_2$) of the control circuit by means of a positive going signal or by the presence of a signal from its stable state, which is the 0-state, into its 1-state; the output of the first inverter (16) being connected with the 1-output of the monostable multivibrator by means of which a logical AND-condition is achieved; and the second inverter (18) having its input connected to the interconnection point (17) between said multivibrator and said first inverter (16) and being arranged to control the memory section of said control circuit;

said memory section comprises a bistable circuit having two NAND-gates (20, 21); and said output section comprises a monostable circuit (22) having a trigger input;

one of the outputs of said memory section being connected to the trigger input of said monostable circuit (22) belonging to the output section for generating a pulsed output signal ($u_1'$), and the second output of said memory section being connected directly to the step output ($u_2$) of said output section, whereby pulsed or DC order signals my be selected by connecting either the pulsed output ($u_1'$) or the step output ($u_2$) to one or more activating means of the controlled process via said output signal program means.

9. Control means according to claim 8 wherein said output section includes an inverting buffer stage (23) and an inverting amplifier (24) coupled to at least one of the pulsed or step signal outputs.

10. Control means according to claim 7 wherein said logic section comprises a relay connected such that blocking against activation or blocking holding is obtained except when the signal fed to said first input occurs before the input signal fed to said second input.

11. Control means according to claim 10 wherein said three program means are combined to form a connecting terminal device for coupling the three programs, which terminal device is common to said programs and further serves as a support for program components and as a connecting device for connecting said program means with said control circuits.

12. Control means according to claim 2 wherein said logic section comprises a controllable, double throw, four-way valve having positive feedback such that it will be blocked against setting or will be held in its set condition for all conditions except when the input signal of said first input occurs earlier than the input signal of said second input.

13. Control means according to claim 2 wherein said program means comprise connecting terminal devices for coupling of programs, direct or indirect coupling of program signals to said control circuits, said control circuits and said program means forming a control unit.

14. Control means according to claim 2 comprising non-return valves connecting said step signal program means to respective step outputs.

15. Control means according to claim 2 comprising non-return valves connecting said step signal program means with respective first and third inputs of said control circuits.

16. Control means according to claim 2 wherein said step signal program means is provided with fixed signal connections according to a desired step sequence program.

17. Control means according to claim 2 comprising a bistable activating means coupling said control circuits to the suboperation means.

18. A sequential operation control means having a plurality of control circuits of which each circuit controls only a single discrete suboperation and said circuits are activated successively and singly in a step-wise manner to deliver an order signal to the suboperation assigned thereto in response to receiving a sensor signal indicating a predetermined state of the suboperation assigned to a preceding control circuit in the succession, further comprising:
  means for supplying operation sensor signals;
  means for supplying operation order signals;
  means in said control circuits for delivering concurrently with said order signal a set signal for the next control circuit in the succession;
  means in said control circuits for delivering concurrently with said order signal a reset signal for a preceding control circuit in the succession;
  a sensor signal program switchboard means connected to said control circuits and to said means for supplying operation sensor signals;
  means connectable to said sensor program switchboard means for permutating said sensor signals;
  an output signal program switchboard means connected to said order signal delivering means of said control circuit and to said means for supplying operation order signals;
  means connectable to said output signal program switchboard means for permutating said order signals;
  a set and reset signal program switchboard means connected to said control circuits; and
  means connectable to said set and reset signal switchboard means for permutating said set and reset signals.

19. A sequential operation control means according to claim 18 wherein said control circuits each include a logic section, a memory section coupled to said logic section, an output section coupled to said memory section, said output section providing respectively an order output signal, a set output signal, and a reset output signal, first and second inputs connected to said logic section for receiving respectively a set and a sensor signal, and a signal order discriminating circuit in said logic section responsive to the arrival of signals at both said first and second logic circuit inputs for causing said order, set, and reset signals to be delivered if, and only if, the signal at said first logic circuit input arrives before the signal at said second logic circuit input.

* * * * *